United States Patent
Xiong

(10) Patent No.: US 8,294,067 B2
(45) Date of Patent: Oct. 23, 2012

(54) COMPUTER COMPONENT TESTING SYSTEM AND TEMPERATURE CONTROL DEVICE THEREOF

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 434 days.

(21) Appl. No.: 12/764,062

(22) Filed: Apr. 20, 2010

(65) Prior Publication Data

US 2011/0147359 A1 Jun. 23, 2011

(30) Foreign Application Priority Data

Dec. 18, 2009 (CN) .......................... 2009 1 0311785

(51) Int. Cl.
*H05B 3/00* (2006.01)

(52) U.S. Cl. ........... 219/209; 219/201; 219/260; 374/45

(58) Field of Classification Search .................. 219/209, 219/201, 260; 374/45
See application file for complete search history.

(56) References Cited

U.S. PATENT DOCUMENTS

2008/0187026 A1* 8/2008 Ueda ............................ 374/185
* cited by examiner

*Primary Examiner* — Long Pham
(74) *Attorney, Agent, or Firm* — Altis Law Group, Inc.

(57) ABSTRACT

A computer component testing system is used to test a temperature operating range of components of a computer. The computer component testing system includes a power supply, a voltage dividing circuit, an amplifier circuit, a heat generator, a temperature control cabinet to receive the computer and the heat generator, and a temperature tester. The temperature of the component of the computer changes via adjusting the variable resistor to change heat generated by the heat generator, to make the component of the computer be in different temperatures. If the computer changes to a second state from the first state in a temperature, the temperature is determined to be an end temperature of the temperature operating range of the component.

11 Claims, 4 Drawing Sheets

COMPUTER COMPONENT TESTING SYSTEM AND TEMPERATURE CONTROL DEVICE THEREOF

BACKGROUND

1. Technical Field

The present disclosure relates to testing systems and, particularly, to a testing system that can test temperature operating range of a computer component.

2. Description of Related Art

Generally, a computer should operate within a certain temperature range. Currently it is difficult to test computer components in a cold environment to ensure they can operate at the low end of the desired range. A common method for determining whether a component can operate in a cold environment involves exposing the element to a refrigerant. However, this is not very efficient when performed in an environment at room temperature.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
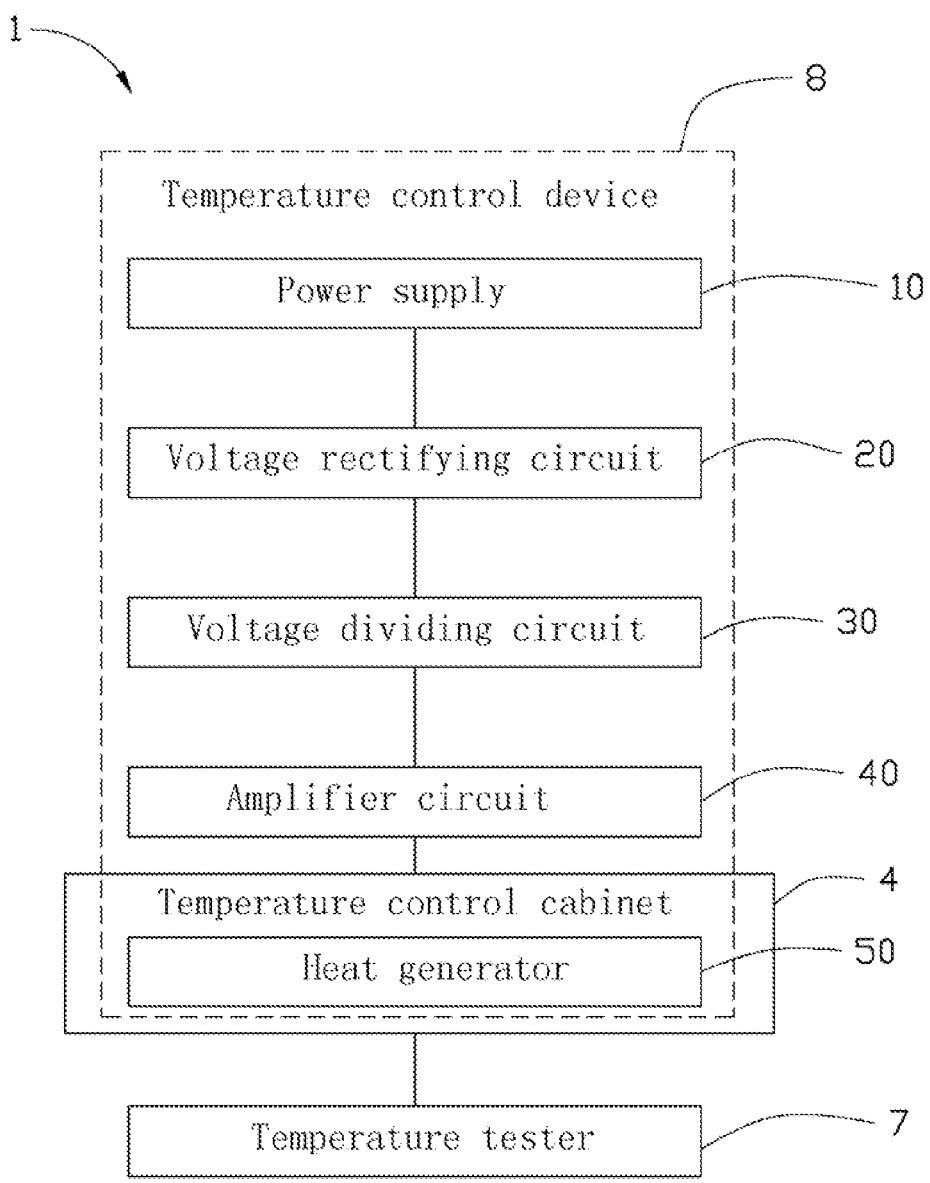
FIG. 1 is a block diagram of one embodiment of a computer component testing system; the testing system includes a temperature control device and a heat generator.
Figure 4:
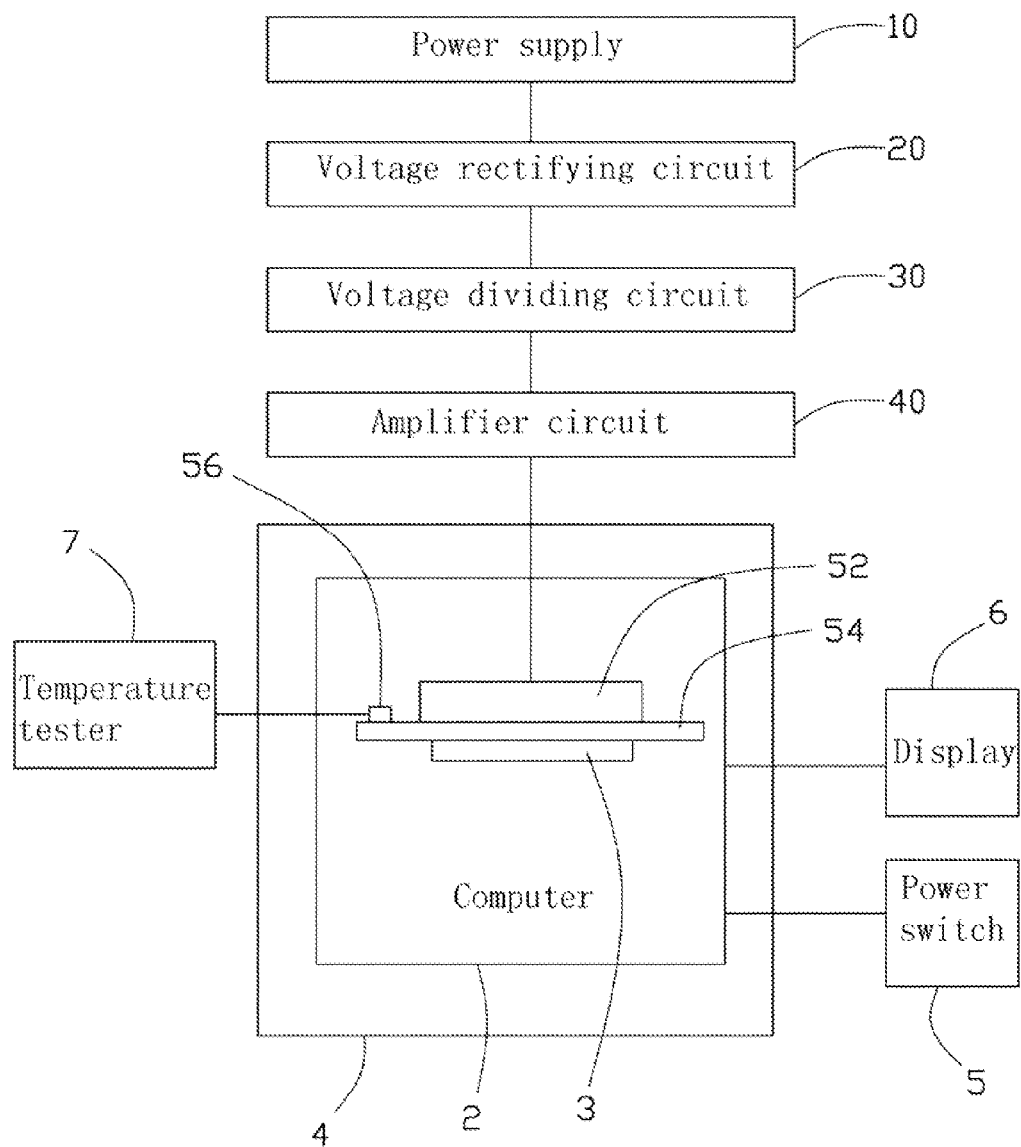
FIG. 4 is a schematic view of the heat invalidation debugging system of FIG. 1 in using.

Referring to FIGS. 1 and 4, an exemplary embodiment of a computer component testing system 1 is used to test temperature operating range of components of a computer 2. The computer component testing system 1 includes a temperature control device 8, a temperature tester 7, and a temperature control cabinet 4. The temperature control cabinet 4 is like a combination refrigerator oven and temperatures therein can controlled to range from frigid below freezing temperatures to very hot oven like temperatures. The temperature control device 8 includes a power supply 10, a voltage rectifying circuit 20, a voltage dividing circuit 30, an amplifier circuit 40, and a heat generator 50. The heat generator 50 is received in the temperature control cabinet 4. The power supply 10, the voltage rectifying circuit 20, the voltage dividing circuit 30, and the amplifier circuit 40 are located outside of the temperature control cabinet 4.

The power supply 10 is used to output an alternating current (AC) voltage. The voltage rectifying circuit 20 is connected to the power supply 10, to receive the AC voltage and convert the AC voltage into a steady direct current (DC) voltage. The voltage dividing circuit 30 is connected between the voltage rectifying circuit 20 and the amplifier circuit 40, to output a dividing voltage to the amplifier circuit 40. The amplifier circuit 40 is connected to the heat generator 50, to supply an amplified signal to the heat generator 5. The heat generator 50 is used to generate heat according to the amplified signal.

Figure 2:
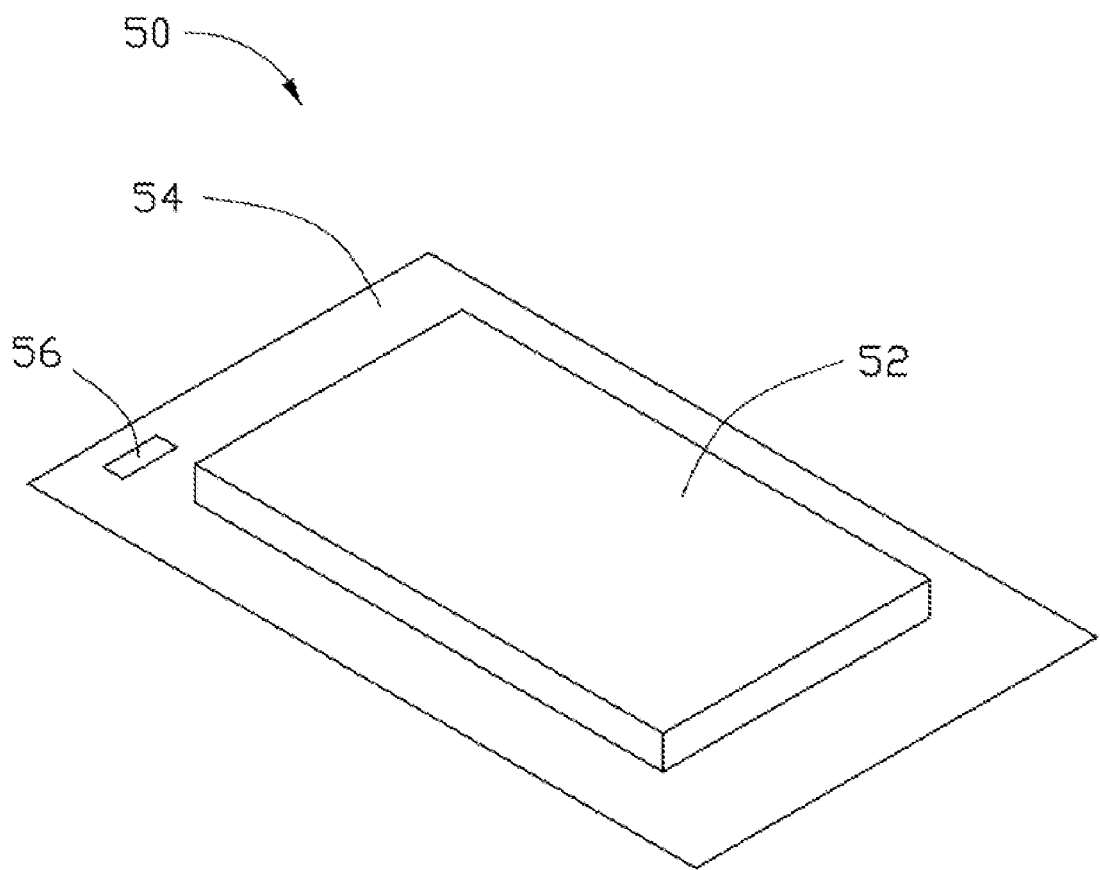
FIG. 2 is a schematic view of the heat generator of FIG. 1.

Referring to FIG. 2, the heat generator 50 includes a cement resistor 52, a heat dissipation board 54, and a temperature sensor 56. The cement resistor 52 and the temperature sensor 56 are mounted on the heat dissipation board 54. A temperature of the cement resistor 52 changes with changes of voltage through the cement resistor 52, that is, if the voltage of the cement resistor 52 increases, the temperature of the cement resistor 52 increases. The heat dissipation board 54 is used to transmit the heat of the cement resistor 52. The temperature sensor 56 is used to sense the temperature of the heat dissipation board 54.

Figure 3:
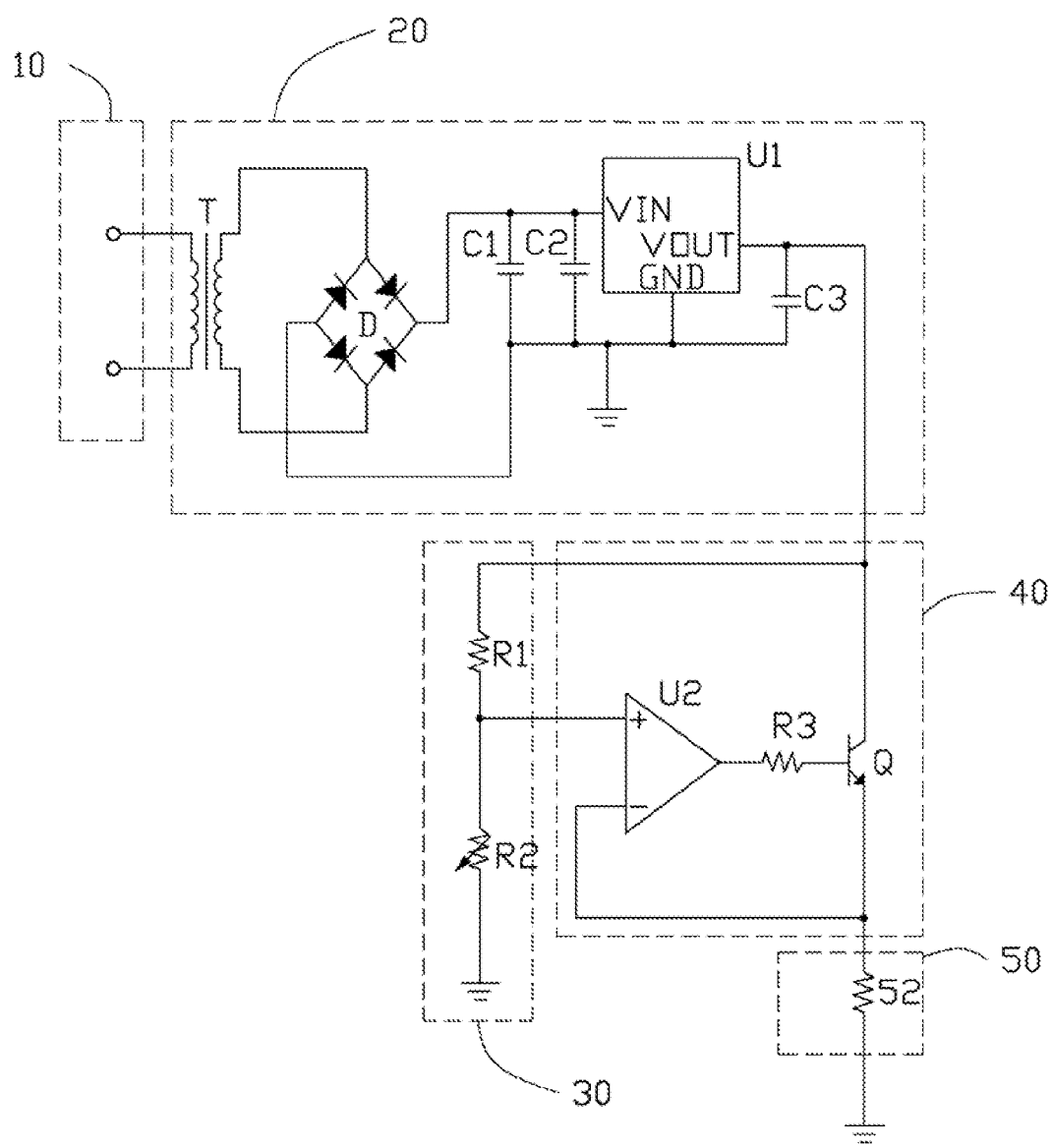
FIG. 3 is a circuit diagram of the temperature control device of FIG. 1.

Referring to FIG. 3, the voltage rectifying circuit 20 includes a transformer T, a rectifier D, capacitors C1-C3, and a voltage stabilizer U1. The voltage dividing circuit 30 includes a resistor R1 and a variable resistor R2. The amplifier circuit 40 includes a resistor R3, an amplifier U2, a transistor Q functioning as an electrical switch. Two input terminals of the transformer T are connected to two output terminal of the power supply 10. Two output terminals of the transformer T are connected to two input terminals of the rectifier D. Two output terminals of the rectifier D are connected to an input terminal VIN and a ground terminal GND of the voltage stabilizer U1, respectively. The ground terminal GND of the voltage stabilizer U1 is grounded. The capacitor C3 is connected between an output terminal VOUT and the ground terminal GND of the voltage stabilizer U1. The capacitors C1 and C2 are connected between the input terminal VIN and the ground terminal GND of the voltage stabilizer U1 in parallel. The resistor R1 and the variable resistor R2 are connected between the output terminal VOUT of the voltage stabilizer U1 and ground. A non-inverting terminal, functioning as an input terminal of the amplifier circuit 40, of the amplifier U2 is connected to a node between the resistor R1 and the variable resistor R2. An inverting terminal of the amplifier U2 is connected to an emitter, functioning as an output terminal of the amplifier circuit 40, of the transistor Q. An output terminal of the amplifier U2 is connected to a base of the transistor Q via the resistor R3. The emitter of the transistor Q is grounded via the cement resistor 52. A collector of the transistor Q is connected to the output terminal VOUT of the voltage stabilizer U1.

In the embodiment, the capacitors C1-C3 are used as filters. The voltage stabilizer U1 is used to steady a voltage from the power supply 10. In other embodiments, the transformer T, the capacitors C1-C3, and the voltage stabilizer U1 can be omitted, and the resistor R1 is connected to the variable resistor R2 in series between a direct current power supply and ground.

Referring to FIG. 4, a testing process of the computer component testing system 1 is described as followed. The heat dissipation board 54 of the heat generator 50 is attached to a computer component such as a chipset 3 via heat dissipation ointment (not shown). The computer 2 is received in the temperature control cabinet 4. A power switch 5 of the computer 2 is exposed out of the temperature control cabinet 4. The computer 2 is connected to a display 6 which is outside of the temperature control cabinet 4, and the temperature sensor 56 on the heat dissipation board 54 is connected to the temperature tester 7, to display the temperature of the heat dissipation board 54, which is, the temperature of the chipset 3. A temperature of the temperature control cabinet 4 is set to minus 30 degrees Celsius. The power switch 5 is turned on, the display 6 displays a message that the computer 2 cannot power on. Resistance of the variable resistor R2 (see FIG. 3) is increased. A voltage of the non-inverting terminal of the amplifier U2 (FIG. 2) increases. A voltage of the output terminal of the amplifier U2 increases. Current of the base of the transistor Q increases. Current of the emitter of the transistor Q increases. Therefore, a voltage across the cement resistor 52 increases and the power of the cement resistor 52 increases. The temperature of the cement resistor 52 increases. A determination is made as to whether the temperature of the tested chipset 3 increases by a predetermined temperature difference, such as 5 deg. C., after the heat of the cement resistor 52 accumulates for a period of time, such as two minutes. If the temperature of the chipset 3 does not increase the temperature difference, the variable resistor R2 needs to be adjusted to increase the temperature of the tested chipset 3 the temperature difference, that is, the temperature of the tested chipset 3 is raised to minus 25 deg. C. The power switch 5 is turned on again, and a determination is made as to whether the computer 2 can power on. If the display 6 displays a message that the computer 2 can power on, which denotes that minus 25 deg. C. is a low end of the temperature operating range of the chipset 3. If the display 6 displays the message that the computer 2 cannot power on, the variable resistor R2 needs to be adjusted to increase the temperature of the chipset 3 the temperature difference and the power switch 5 is turned on, until to the computer 2 can power on. Other chipsets 3 and other components in the computer 2 can be determined the low end of the temperature operating range according to the above-mentioned process.

Similarly, a high end of the temperature operating range of the chipset 3 can be determined according to the above-mentioned process. For example, the temperature control cabinet 4 is set to at room temperature in which the computer 2 is at power-on state, the variable resistor R2 is adjusted to increase the temperature of the chipset 3 the temperature difference. When the temperature of the chipset 3 is between the room temperature and a reset temperature, such as 50 deg. C., and if the computer 2 powers off automatically, it denotes that the temperature which leads to the computer 2 powers off is the high end of the temperature operating range of the chipset 3.

The temperature operating range of the components of the computer 2 can be determined. If the computer 2 cannot power on in a cold environment or in a hot environment, it is ascertained which component leads to the computer 2 cannot power on according to the temperature operating range of the components of the computer 2.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer component testing system to test a temperature operating range of components of a computer, the computer component testing system comprising:
    a power supply to supply power;
    a voltage dividing circuit comprising a resistor and a variable resistor connected to the resistor in series between the power supply and ground, to supply a dividing voltage;
    an amplifier circuit comprising an input terminal connected to a node between the resistor and the variable resistor to receive the dividing voltage, and an output terminal to output an amplified signal;
    a heat generator attach to the component of the computer to generate heat according to the received amplified signal and transmit heat to the component of the computer;
    a temperature control cabinet to receive the computer and the heat generator, wherein the temperature control cabinet is set to a temperature in which the computer is at a first state; and
    a temperature tester connected to the heat generator to test and display the temperature of the component of the computer;
    wherein the temperature of the component of the computer changes via adjusting the variable resistor to change heat generated by the heat generator, to make each component of the computer be in different temperatures, if the computer changes to a second state from the first state in a temperature, the temperature is determined to be the end temperature operating range of the component.

2. The computer component testing system of claim 1, wherein the first state is a power-off state, the second state is a power-on state, the end temperature is a low end of the temperature operating range of the component.

3. The computer component testing system of claim 1, wherein the first state is a power-on state, the second state is a power-off state, the end temperature is a high end of the temperature operating range of the component.

4. The computer component testing system of claim 1, wherein the amplifier circuit comprises an amplifier and an electrical switch, a non-inverting terminal of the amplifier is connected to the node between the resistor and the variable resistor, an inverting terminal of the amplifier is connected to a first terminal of the electrical switch, an output terminal of the amplifier is connected to a second terminal of the electrical switch, the first terminal of the electrical switch is grounded via the heat generator, a third terminal of the electrical switch is connected to the power supply.

5. The computer component testing system of claim 1, wherein the heat generator comprises a heat dissipation board, a cement resistor mounted to the heat dissipation board, and a temperature sensor mounted to the heat dissipation board to sense the temperature of the heat dissipation board, the temperature tester is connected to the temperature sensor, the output terminal of the amplifier is grounded via the cement resistor.

6. The computer component testing system of claim 5, wherein the heat dissipation board is attached to the component of the computer via heat dissipation ointment.

7. A temperature control device to control a temperature of a computer component, the temperature control device comprising:
    a power supply to supply power;
    a voltage dividing circuit comprising a resistor and a variable resistor connected to the resistor in series between the power supply and ground, to supply a dividing voltage;
    an amplifier circuit comprising an input terminal connected to a node between the resistor and the variable resistor to receive the dividing voltage, and an output terminal to output an amplified signal; and
    a heat generator attached to the component to generate heat according to the received amplified signal and transmit heat to the component;
    wherein the temperature of the component changes via adjusting the variable resistor to change the dividing voltage, to change the heat generated by the heat generator.

8. The temperature control device of claim 7, wherein the amplifier circuit comprises an amplifier and an electrical switch, a non-inverting terminal of the amplifier is connected to the node between the resistor and the variable resistor, an inverting terminal of the amplifier is connected to a first terminal of the electrical switch, an output terminal of the amplifier is connected to a second terminal of the electrical switch, the first terminal of the electrical switch is grounded via the heat generator, a third terminal of the electrical switch is connected to the power supply.

9. The temperature control device of claim 7, wherein the heat generator comprises a heat dissipation board and a temperature sensor mounted to the heat dissipation board to sense the temperature of the component, the cement resistor and the temperature sensor mount to the component, the output terminal of the amplifier is grounded via the cement resistor.

10. The temperature control device of claim 7, wherein the heat generator comprises a heat dissipation board, a cement resistor mounted to the heat dissipation board, and a temperature sensor mounted to the heat dissipation board to sense the temperature of the heat dissipation board, the cement resistor and the temperature sensor are mounted to the heat dissipation board, the heat dissipation board is mounted to the component, the temperature of the component changes via adjusting the variable resistor to change the dividing voltage, to change the temperature of the cement resistor.

11. The temperature control device of claim 10, wherein the heat dissipation board is attached to the component via heat dissipation ointment.

* * * * *